G. GOEWEY.
Apparatus for Treating and Ageing Spirituous Liquors.
No. 141,554. Patented August 5, 1873.
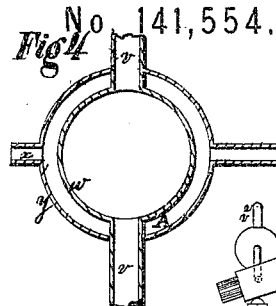
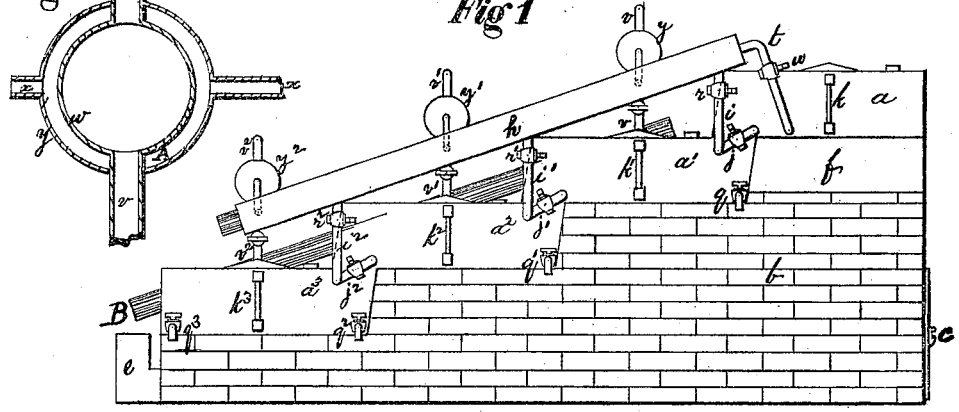
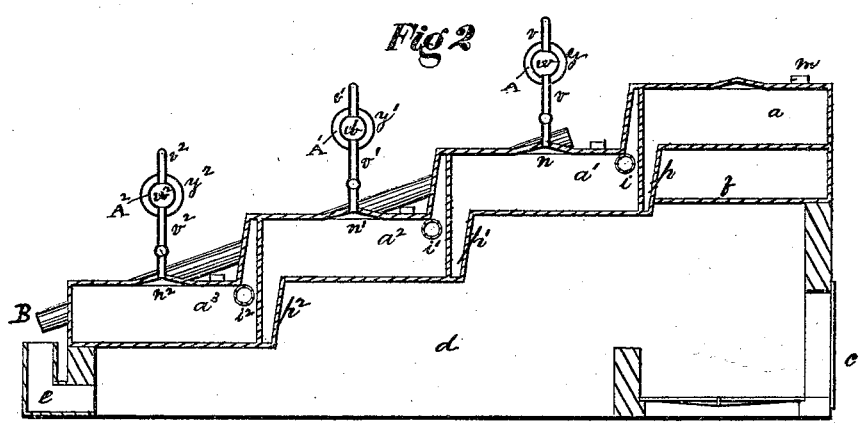
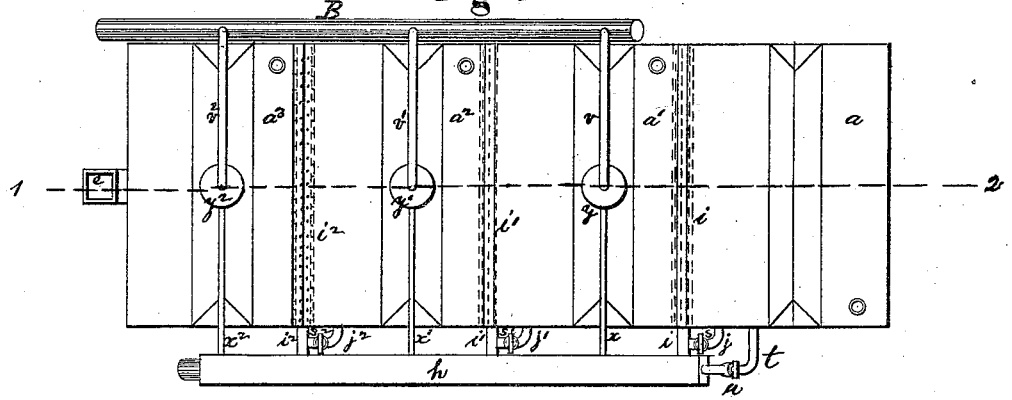
Witnesses:
Benj. F. Hoeckley
W. H. L. Dougherty
Inventor:
George Goewey

UNITED STATES PATENT OFFICE.

GEORGE GOEWEY, OF PHILADELPHIA, PENNSYLVANIA.

IMPROVEMENT IN APPARATUS FOR TREATING AND AGING SPIRITUOUS LIQUORS.

Specification forming part of Letters Patent No. 141,554, dated August 5, 1873; application filed June 14, 1873.

*To all whom it may concern:*

Be it known that I, GEORGE GOEWEY, of Philadelphia, Pennsylvania, have invented Improvements in the Process and Apparatus for Aging and Purifying Alcoholic Liquors, of which the following is a specification:

My improvements relate to the process and apparatus for which Letters Patent No. 91,840 were granted to me 29th June, 1869. My improvements consist of, first, means for condensing and saving the spirituous portion of the mixed vapors escaping from the close vessels $a$ $a^1$ $a^2$, as the vapors pass out of these vessels; second, means for connecting the air-conduit $h$ with the liquor pan or vessel $a$ for promoting the flow of the liquor from said pan into the pan $a^1$, as hereinafter described.

In the drawings, Figure 1 is a side elevation of the apparatus described in my said patent, and of my said improvements on the same; Fig. 2, a longitudinal vertical section of the same on the line 1 2 of Fig. 3; Fig. 3, a plan of the same; Fig. 4, a diametrical section, on an enlarged scale, of the globular vessels employed for purposes of condensation.

The pans or vessels $a$ $a^1$ $a^2$ $a^3$, the masonary $b$, furnace $c$, passage-way $d$, escape-aperture $e$, water-pan $f$, air-conduit $h$ connected with a pan-blower, (not shown,) pipes $i$ $i^1$ $i^2$, liquor-pipes $j$ $j^1$ $j^2$, gages $k$ $k^1$ $k^2$ $k^3$, Fig. 1, supply-aperture $m$ in pan $a$, vapor-apertures $n$ $n^1$ $n^2$, screening-projections $p$ $p^1$ $p^2$ of pans $a$ $a^1$ $a^2$, respectively, emptying-cocks $q$ $q^1$ $q^2$ $q^3$, stop-cocks $r$ $r^1$ $r^2$ $s$ $s^1$ $s^2$, in their construction, arrangement, and operation, correspond with the construction, arrangement, and operation of the several parts described by similar letters of reference in my said patent.

To increase the efficiency of this apparatus I have added thereto as follows, viz.: $t$, Figs. 1 and 3, is a pipe for connecting the air-conduit $h$ with the chamber of vessel $a$. $u$ is a stop-cock in pipe $t$. $v$ $v^1$ $v^2$ are pipes attached at the apertures $n$ $n^1$ $n^2$ to vessels $a^1$ $a^2$ $a^3$, respectively, and these pipes are enlarged so as to form vessels $w$ $w^1$ $w^2$ of globular form, respectively, as shown in Figs. 2 and 4. $x$ $x^1$ $x^2$, Figs. 3 and 4, are pipes attached to the air-conduit $h$, and these pipes are made to enlarge so as to form vessels $y$ $y^1$ $y^2$ of globular form, inclosing the said vessels $w$ $w^1$ $w^2$, and a free intervening space, A, Figs. 2 and 4, for air between the vessels $w$ and $y$, $w^1$ and $y^1$, $w^2$ and $y^2$, respectively, as shown in Figs. 2 and 4. The pipes $v$ $v^1$ $v^2$ are extended from the vessels $w$, $w^1$, and $w^2$, and lead into the pipe B. The pipes $x$ $x^1$ $x^2$ are extended from the vessels $y$ $y^1$ $y^2$ into the open air.

The vapors or mixed spirits and air escaping from the several close vessels $a^1$ $a^2$ $a^3$ into the globes $w$ $w^1$ $w^2$ are cooled, and the spirits they contain are condensed by the influence of the compressed or forced current of air led into the spaces A A$^1$ A$^2$, respectively. The condensed spirits run back from the globes $w$ $w^1$ $w^2$ through the pipes $v$ $v^1$ $v^2$ into pans $a^1$ $a^2$ $a^3$, while the airy portions of the vapors pass on out of the globes $w$ $w^1$ $w^2$ through the extensions of pipes $v$ $v^1$ $v^2$ into pipe B, and through it out into the atmosphere; or, if preferred, into a receptacle for receiving any small quantity of liquid that may be carried off by it mechanically.

The air employed for cooling purposes passes out from the spaces A A$^1$ A$^2$ through pipes $x$ $x^1$ $x^2$ into the atmosphere.

Connection between the air-conduit $h$ and the vessel $a$ to equalize the pressure of air in the vessels $a$ and $a^1$, and thus promote the flow of the liquor from the former into the latter vessel, is essential to the proper action of this part of the apparatus; but I do not limit myself to the use of a pipe, much less any particular form of pipe, for this purpose. Neither is it essential that the condensing-vessels $w$ and $y$ shall be of globular form, although I believe this to be the best form for them.

I claim—

1. The spirit-condensing apparatus composed of an interior vessel, $w$, an inclosing or exterior vessel, $y$, and an intervening air-space, A, between said vessels, in combination with means for the ingress and egress to and from said space of a forced current of air, substantially as set forth.

2. Pipe $t$ or equivalent means for connecting the air-conduit $h$ with the liquor-pan $a$, to facilitate the flow of the liquor from the said pan into the pan $a^1$, substantially as set forth.

GEORGE GOEWEY.

Witnesses:
BENJ. F. HOECKLEY,
W. W. DOUGHERTY.